United States Patent
Spoon et al.

(10) Patent No.: US 9,652,359 B1
(45) Date of Patent: May 16, 2017

(54) ANNOTATION NATURAL KEYS FOR SOURCE CODE ANALYSIS

(71) Applicant: SEMMLE LIMITED, Oxford (GB)

(72) Inventors: Alexander Spoon, Atlanta, GA (US); Julian Tibble, Oxford (GB)

(73) Assignee: Semmle Limited, Oxford (GB)

(*) Notice: Subject to any disclaimer, the term of this patent is extended or adjusted under 35 U.S.C. 154(b) by 0 days.

(21) Appl. No.: 15/336,241

(22) Filed: Oct. 27, 2016

(51) Int. Cl.
*G06F 9/44* (2006.01)
*G06F 11/36* (2006.01)
*G06F 17/30* (2006.01)
*G06F 17/24* (2006.01)

(52) U.S. Cl.
CPC ........ *G06F 11/3604* (2013.01); *G06F 17/241* (2013.01); *G06F 17/30613* (2013.01); *G06F 17/30657* (2013.01)

(58) Field of Classification Search
CPC ............. G06F 11/3604; G06F 11/3688; G06F 11/3684; G06F 17/30613; G06F 17/30657; G06F 17/241; G06F 9/44589
USPC ......................................... 717/126, 130, 131
See application file for complete search history.

(56) References Cited

U.S. PATENT DOCUMENTS

| | | | | |
|---|---|---|---|---|
| 2006/0294502 A1* | 12/2006 | Das | ........................... | G06F 8/73 717/129 |
| 2011/0047532 A1* | 2/2011 | Wang | .................. | G06F 11/3676 717/130 |
| 2012/0254835 A1* | 10/2012 | Muddu | ...................... | G06F 8/36 717/121 |
| 2016/0078102 A1* | 3/2016 | Crouch | ............. | G06F 17/30616 707/722 |
| 2016/0170746 A1* | 6/2016 | Neubeck | ................... | G06F 8/73 717/122 |

* cited by examiner

*Primary Examiner* — Anna Deng
(74) *Attorney, Agent, or Firm* — Fish & Richardson P.C.

(57) ABSTRACT

Methods, systems, and apparatus, including computer programs encoded on computer storage media, for generating natural keys for software annotations. One of the methods includes receiving a source code representation of a collection of source code, the source code having an annotation attached to a particular source code element in the source code. An index is generated for the annotation, the index representing a position of the annotation in an order of all annotations attached to the particular source code element. A natural key is generated for the annotation including combining a key of the particular source code element and the index for the annotation. A data entry is generated for the annotation, the data entry having the natural key for the annotation.

27 Claims, 3 Drawing Sheets

ANNOTATION NATURAL KEYS FOR SOURCE CODE ANALYSIS

BACKGROUND

This specification relates to static analysis of software source code.

Static analysis refers to techniques for analyzing computer software source code without executing the source code as a computer software program. Static analysis systems analyze source code to determine various properties about source code in a code base.

Static analysis systems can identify characteristic segments of source code in the code base. A characteristic segment of source code is a segment of source code having a particular attribute of interest. Static analysis systems can generate analysis results that include data specifying where, in the code base, the characteristic segments of source code occur.

Static analysis systems can uniquely distinguish one source code element from another using keys. The keys can be used to maintain attributes of source code elements in a database.

A natural database key is a key that can be computed from attributes of the data that the key identifies. In other words, a natural key can be computed from the data regardless of how the data is stored in a database. For example, a person's phone number is often used as a natural key for distinguishing the person from other people in the database. The phone number does not change if the underlying structure of the data is changed or if the database is rebuilt. In contrast, surrogate keys are keys that are generated by arbitrary assignment, often coming from a source unrelated to the data being identified. For example, keys that are generated sequentially are surrogate keys.

Some programming languages, e.g., Java, support annotations. An annotation is a programming construct for associating arbitrary, structured, and unordered metadata with source code elements. In many cases, annotations do not affect how a program executes, but annotations may affect how a program is compiled. Annotations can be attached to a variety of source elements, e.g., classes, fields, methods, variables, parameters, packages, or other source code elements.

An annotation may have one or more arguments. Each argument can be named or unnamed, and each argument can have a corresponding value. Annotations can also be nested. In other words, an argument within an annotation may be another annotation.

The following segment of source code illustrates an annotation that is defined in source code preceding the definition of the class "Test":

@ExampleAnnot {
name="Kirk",
addresses={"Address 1", "Address 2"},
nestedAnnot=@Name(name="Bones")
}
class Test{ . . .

This annotation, ExampleAnnot, includes three arguments—a string, an array, and a nested annotation. The string argument indicates that the class "Test" has associated metadata having an identifier "name" with a value of "Kirk". The array argument indicates that the class "Test" has associated metadata having an identifier "addresses", which identifies an array having respective values of "Address 1", and "Address2". The nested annotation argument indicates that the class "Test" has associated metadata having an identifier "nestedAnnot", which itself identifies a nested annotation named "Name". The nested annotation has a string argument having an identifier "name" and having the value "Bones".

When the value of an annotation argument is a nested annotation, the name of the nested annotation need not be unique within the top-level annotation. In other words, the annotation ExampleAnnot could validly have another argument that is a nested annotation named "Name." Furthermore, the second nested annotation could also have a string argument having an identifier "name" and having a value of "Bones." Thus, even in this simple example, the identifier "name" may occur as an argument identifier three times within this simple top-level annotation.

SUMMARY

This specification describes how a static analysis system can generate natural keys for annotations and annotation arguments in source code. Natural keys are keys that can be generated using data that first uniquely identifies the source code element, e.g., class, that is associated with the key, and this can be combined with information uniquely identifying the annotation within the element, e.g., the ordinal location.

Particular embodiments of the subject matter described in this specification can be implemented so as to realize one or more of the following advantages. By using natural keys instead of surrogate keys, a static analysis system can uniquely identify repeated instances of the same annotation in the same compile. The natural keys are stable even in the face of whitespace changes and semantically neutral changes to the annotation's arguments, e.g., the order of the arguments. Furthermore, the natural keys are consistent whether they are calculated from software source code, or a compiled representation of that software source code such as a Java class file. The natural key is synthesized from features of the annotation rather than being arbitrarily assigned like surrogate keys. This also allows for annotations to be keyed using information that is meaningful to a developer. The system can generate unique natural keys for multiple nested annotations that have the same name. Use of natural keys can aid in systems that have several independent processes generating data. For example, use of natural keys can enable independent processes to generate the same keys without communicating with each other. When running in parallel, on different machines, and/or at different times, the natural keys can easily be regenerated.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a static analysis system can uniquely identify annotations and annotation arguments in source code using natural keys. By using natural keys instead of surrogate keys, a static analysis system can uniquely identify repeated instances of the same annotation in the same compile. The natural key is synthesized from features of the annotation rather than being generated to have an arbitrary or random value. This also allows for annotations to be keyed using information that is meaningful to a human or an external system.

This unique identification of annotations can be used in managing a database that stores and operates on attributes of source code that includes the annotations.

Figure 1:
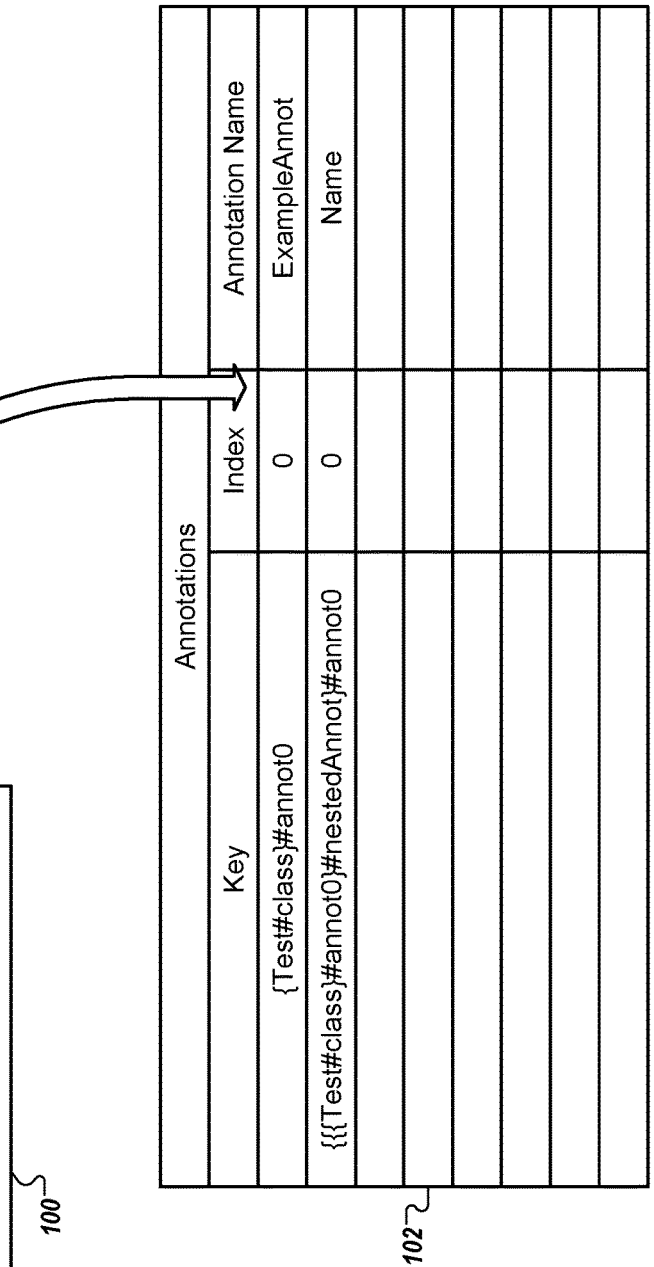
FIG. 1 is a schematic diagram of source code whose attributes are stored in a relation.

FIG. 1 is a schematic diagram of source code 100 whose attributes are stored in a relation 102. In this example, the file Example.Classpath.Text.java includes the source code from the example above, which, for clarity, is reproduced here:

@ExampleAnnot {
name="Kirk",
addresses={"Address 1", "Address 2"},
nestedAnnot=@Name(name="Bones")
}
class Test{
. . .
. . .
. . .

In this example, the source code 100 is written in the Java language, and the annotation 104 is a Java annotation. However, the same techniques can also be used for other programming languages that have similar features as annotations, e.g., Scala and Go programming languages.

The source code 100 can be examined by a static analysis system to generate properties of source code elements within the source code 100. An annotation 104 is identified within a file called Example.Classpath.Test.java. Features of the annotation 104 may then be used by the computer system to generate a natural key for the annotation 104.

In general terms, the natural key for the annotation 104 uniquely identifies the annotation 104 and distinguishes it from other annotations in the code base. In some source code collections there may be multiple instances of the file for Example.Classpath.Test.java, the corresponding bytecode, or both. For example, a source code collection may have different versions of the same software application, or different utilities in the same application may each contain their own copy of Example.Classpath.Test.java. In these cases, all instances of the annotation 104 produce the same natural key because the features of the annotation 104 are identical. In some implementations, the natural keys are stable when semantically neutral changes are made to the annotation. For example, if the order of the arguments within an annotation changes, the key for the annotation would not change.

To generate the natural key for the annotation 104, the system can identify a first key of the parent source code element to which the annotation is associated. The first key can uniquely distinguish the parent source code element from other source code elements in the collection of source code. In this case, the element is a Java class having the fully qualified name Example.Classpath.Test.java. For this class, the system can generate the example natural key "Test#class" for this class. In this example, the source code element to which the annotation is attached also has a natural key, but this need not be the case. Rather, the source code element to which the annotation is attached can also have a surrogate key instead of a natural key. For example, the class could have the arbitrarily generated surrogate key "00036".

Annotations that are "attached" to a source code element are annotations that directly annotate a parent source code element, as opposed to annotations that might be otherwise associated with the source code element. For example, if a top-level annotation has a nested annotation, the top-level annotation is considered to be attached to the source code element, while the nested annotation is merely associated with the source code element. Therefore, an annotation being "attached" to a source code element implicitly identifies the source code element as a parent source code element of the annotation. Similarly, a source code element being described as a parent source code element of an annotation implicitly identifies the annotation as being attached to the parent source code element.

The system next determines an index for the annotation. The index for the annotation represents a position of the annotation relative to other annotations attached to the parent source code element. To generate an index for the annotation, the system first determines how many annotations are attached to the parent source code element. After determining how many annotations are attached to the parent source code element, the system determines an index that represents the ordinal position of the annotation among other annotations, if any, attached to the parent source code element. In this example, the annotations attached to the Example.Classpath.Test.java class can be counted and a position in the order of attached annotations for the annotation 104 can be determined. The determined position can be used as an index to uniquely distinguish the annotation 104 from any other annotations that are attached to the Example.Classpath.Test.java class. For example, if a second annotation is attached to the Example.Classpath.Test.java class, the annotation 104 might have an index of 1 instead of 0.

The natural key for the annotation 104 can thus be generated by combining the identifier for the parent class with the index for the annotation 104 among other annotations, if any, attached to the parent class.

The system can do so in a way that preserves structural and semantic information about the annotation. For example, the system can use structural delimiters to delineate the key of the parent source code element from other parts of the key for the annotation. In addition, the system can also use semantic tags that designate certain parts of the key as containing semantic information, e.g., type information for annotation and its arguments.

In the example of FIG. 1, for the annotation ExampleAnnot the system can generate the natural key "{Test#class}#annot0". In this example, the key for the parent source code element is "Test#class", which itself has a semantic tag of "#class" to indicate that the key is for a class as opposed to some other kind of source code element, e.g., a method. However, as mentioned above, the key for the parent source code element could also be a surrogate key or any other appropriate key. The natural key uses braces ("0") as structural delimiters and the semantic tag "#annot0" to indicate that the key is for an annotation and to specify the index for the annotation. Thus, the full natural key includes (1) structural delimiters around (2) the key for the parent source code element followed by (3) a semantic tag for annotations, which includes the index of the annotation.

The system can also generate natural keys for annotation arguments. The natural key for an annotation argument can include the natural key for the top-level annotation as well as the name for the annotation argument. For example, the annotation argument "name" can have the natural key "{{Test#class}#annot0}#name". In this example, further structural delimiters have been added to preserve the structural information about "name" being an argument of the annotation identified by a natural key. Thus, the full natural key includes (1) structural delimiters around (2) the key for the parent annotation followed by (3) a semantic tag for arguments, which includes the name of the argument.

Annotation arguments themselves may also have structural information. For example, an annotation argument can be an array or a nested annotation. For these annotations, the system can use further structural delimiters in order to preserve this structural information. For example, the annotation argument "nestedAnnot" can have the natural key "{{{Test#class}#annot0}#nestedAnnot}#annot0". The natural key for this nested annotation thus includes (1) structural delimiters around (2) the key for the annotation argument followed by (3) a semantic tag for annotations. As described above, the semantic tag for annotations can include an index for the annotation that indicates a position of the annotation relative to other annotations attached to that parent element. But because annotation arguments cannot declare multiple nested annotation values, nested annotations can only have one parent. Therefore, the index for a nested annotation will typically be zero. Thus, in some implementations, the system can omit the index in the semantic tag for nested annotations.

For an annotation arguments that are elements of an array, the system can include in the natural key array indexes to indicate the position of the elements in the array. For example, the annotation argument value "Address 2" can have the natural key "{{{Test#class}#annot0}#addresses}#1". The natural key for this array annotation argument thus includes (1) structural delimiters around (2) the key for the annotation argument followed by (3) a semantic tag for array elements, which includes the array index of the array element. In this example, the semantic tag for array elements includes only the hash character, while the semantic tag for annotations includes "annot." In other words, the semantic tag for annotations is made explicit with the characters "annot," while the semantic tag for the array element is implicit because it is unambiguous. However, the system could also further distinguish semantic tags for array elements using something equivalent, e.g., "#array," which would result in the natural key ""{{{Test#class}#annot0}#addresses}#array1" in this example.

These techniques for generating natural keys for annotation arguments makes the natural keys stable in the face of semantically neutral changes to the annotation. In particular, if the order of the arguments within the annotation is changed, the natural keys for the annotation arguments will not change.

Data for the annotation 104 can be stored in the database relation 102. For example, the source code 100 may be processed so that the attributes for some or all of the elements of the source code 100 are stored in the database relation 102. Depending on the configuration, the database may have different relations for different types of source code elements, e.g., a relation for class annotations, method annotations, and variable annotations, as well as different columns than those shown. Other storage configurations are possible, too.

As shown in this example, attributes of the annotation 104 are entered in a row of the database relation 102. The key for the entry is the natural key generated as described above, "{Test#class}#annot0". The key is used to store attributes of the annotation 104, e.g. the index of the annotation and the annotation name. In some implementations, the system need not explicitly store a separate attribute for the key of the parent source code element because the key is already included in the key for the annotation. In other words, the system can generate the key "Test#class" for the parent class from the natural key of the annotation itself.

With the information for the annotation 104 stored in the database relation 102, requests to the database may request some action using the data of the annotation 104. For example, a Simple Query Language (SQL) query may identify an operation to be performed on an annotation having the natural key ""{Test#class}#annot0". The database and related computer systems may process the query using the data in the database and return query results related to the annotation 104.

Figure 2:
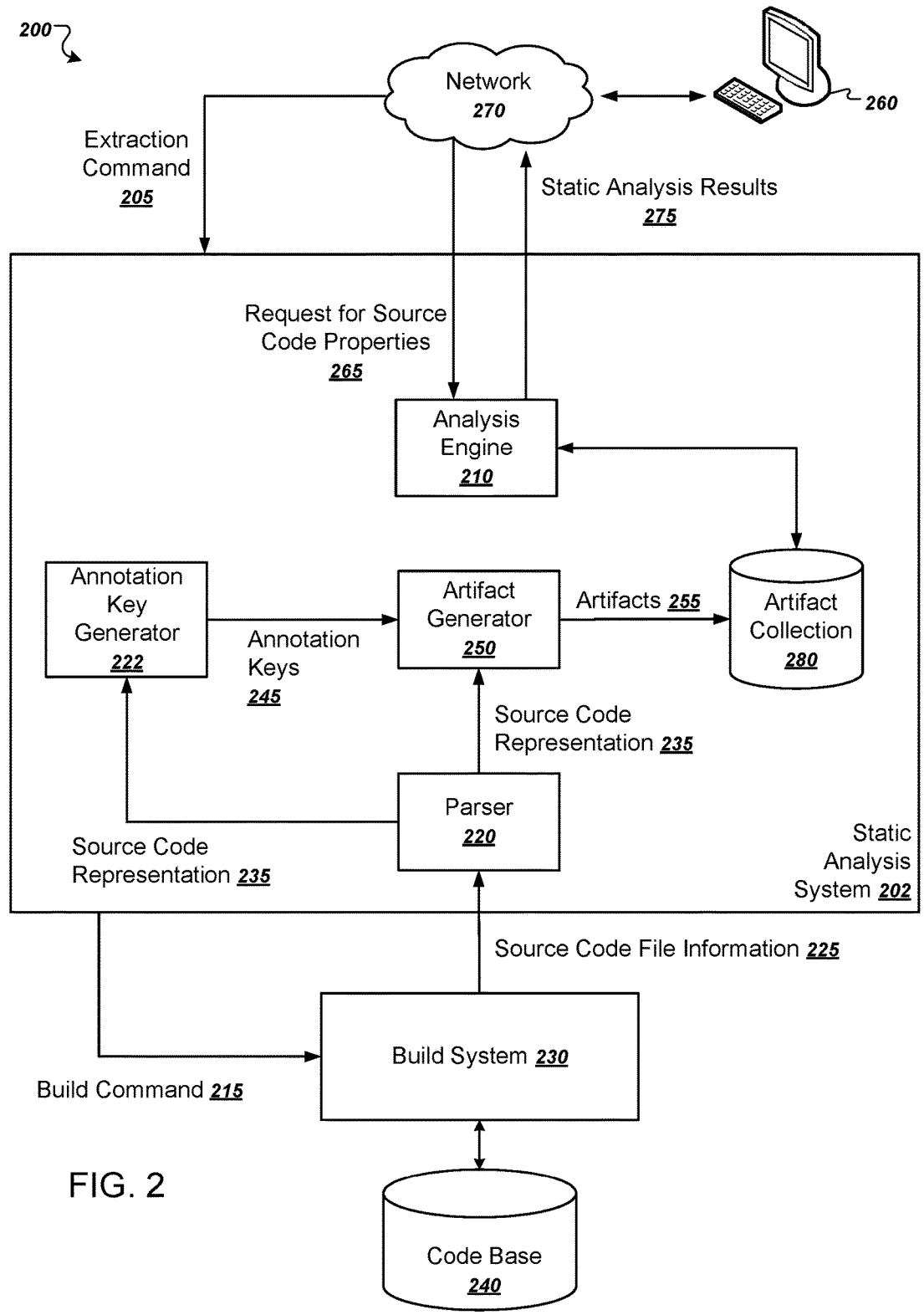
FIG. 2 is a diagram of an example system.

FIG. 2 is a diagram of an example system 200. The system 200 may be used, for example, to collect information about annotations in source codes and store that information in a database that uses natural keys for the annotations. The system 200 includes a user device 260 in communication with a static analysis system 202 over a network, 270, which can be any appropriate communications network. The system 200 is an example of a system in which a static analysis system 202 employs an annotations engine 222 to operate with annotations in source code.

The static analysis system includes an analysis engine 210, the annotation key generator 222, a source code extractor 220, and an artifact generator that stores analysis artifacts in an artifact collection 280, which may be, for example, a relational database or another type of technologically appropriate database. The components of the static analysis system 202 can be implemented as computer programs installed on one or more computers in one or more locations that are coupled to each through a network. Alternatively, the static analysis system 202 can be installed in whole or in part on a single computing device, e.g., the user device 260.

The static analysis system 202 is in communication with a build system 230. The build system 230 can be installed on a single computer or on multiple computers. The static analysis system 202 and the build system 230 can be installed on different computing devices that are in communication with one another, e.g., using the network 270, or the static analysis system 202 and the build system 230 can be installed on a same computing device.

The build system 230 operates on source code in a code base 240. The build system 230 can include compilers that compile the source code, or the build system can be a system that does not compile source code. For example, the code base 240 can include interpreted languages such as Python or JavaScript that do not use a compiler at all.

In operation, the user device 260 provides an extraction command 205 to the static analysis system 202. The extraction command 205 is a request for the static analysis system 202 to extract source code that is processed by the build system 230. In some implementations, the static analysis system 202 causes the build system 230 to initiate a build of source code in the code base 240. For example, the static analysis system can provide a build command 215 to the build system 230 to initiate a build.

The build command 215 causes the static analysis system to receive intercepted source code file information 225 for source code processed by the build system 230. The source code file information 225 provides the static analysis system 202 with access to the source code processed by the build system. For example, the source code file information 225 can include the source code itself or a location, e.g., a file path, to a source code file. Suitable techniques for instrumenting build systems are described in more detail in U.S. Pat. No. 9,110,737, entitled "Extracting Source Code," and in U.S. application Ser. No. 14/947,631, entitled "Transparent Process Interception," both of which are herein incorporated by reference.

Regardless of the instrumentation technique used, the parser 220 receives the source code file information 225 in order to access precisely the source code that is processed by the build system 230. The parser 220 can be a standalone parser for a particular programming language, or the parser can be implemented as part of a compiler or an interpreter. The parser 220 uses the accessed source code to generate a source code representation 235, which can be a compiled or interpreted representation of the source code, e.g., data representing a parse tree.

An artifact generator 250 receives the source code representation 235 and generates one or more artifacts 255, which are stored in an artifact collection 280. An analysis artifact is a collection of data generated by a component of a static analysis system, as opposed to an object file or an executable generated by the build system 230. Analysis artifacts can be stored as files of a file system or stored in any appropriate data repository, e.g., as records in a database.

An annotation key generator 222 receives the source code representation 235 and generates annotation keys 245. The annotation key generator 222 passes the annotation keys 245 to the artifact generator 250 for use in generating the artifacts 255. For example, artifacts 255 related to annotations may be generated by the artifact generator 250 using the annotation keys 245. In this example, the artifact generator 250 is shown separate from the annotation key generator 222 within the static analysis system 202. In some implementations, the annotation key generator 222 is a component of the artifact generator 250.

The analysis artifacts 255 generated by a static analysis system typically include various properties of the source code in the source code files, e.g., information that describes relationships between source code constructs in the source code, e.g., between types, variables, functions, and classes. For example, the analysis artifacts 255 can include an original type for the source code constructs as output by the parser.

To provide static analysis results, the system 202 receives, from the user device 260, a request for source code properties 265 of a portion of the code base 240.

An analysis engine 210 receives the request 265 and uses one or more static analyzers to analyze data stored in the artifact collection 280 in order to generate static analysis results 275. In particular, the analysis engine 210 can use static analyzers that operate on artifacts 255 associated with annotations in the source code. Each static analyzer can be implemented as a separate computer program or function. In some implementations, each analyzer is implemented as a query that operates on the artifact collection 280.

Figure 3:
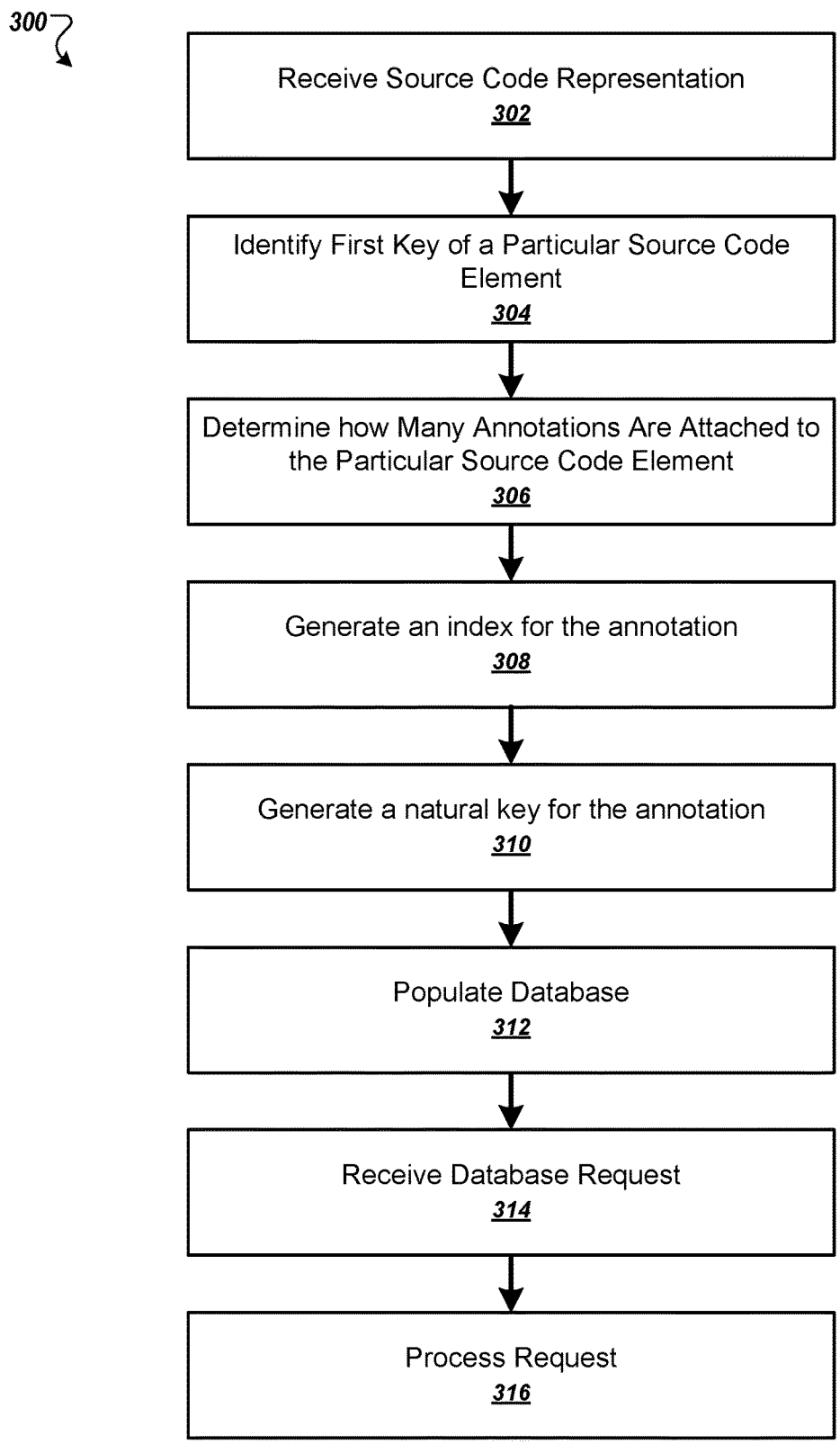
FIG. 3 is a flow chart of an example process for using natural keys to reference information related to annotations in source code.

The analysis engine 210 then provides the static analysis results 275 back to the user device 260, where the user device 260 presents the results 275 to a user. For example, the static analysis results can be presented as part of an integrated development environment (IDE) or in a command line environment. The static analysis results 275 can identify annotations by natural keys that uniquely identify each annotation FIG. 3 is a flow chart of an example process 300 for using natural keys to reference information related to annotations in source code. The process will be described as being performed by an appropriately programmed system of one or more computers, e.g., the static analysis system 202 of FIG. 2.

The system receives a source code representation (302). The source code has one or more annotations that are each attached to and store metadata for respective source code elements of the source code. For example, the build system 230 may build a collection of source code files that contain source code elements such as classes, objects, functions, methods, data, or annotations. For example, the annotation key generator 222 can generate annotation information 245 based on the source code representation 135.

The system identifies a first key of a particular source code element (304). The first key uniquely identifies the parent source code element to which a particular annotation is attached. The first key can, for example, be a class name, a function or method name, or the name of another source code element. This name may be fully qualified to be unique within the source code collection, with every instance of the source code element may have the same and only the same name.

The system determines how many annotations are attached to the particular source code element (306).

The system generates an index for the annotation (308). The index uniquely distinguishes the annotation from other annotations that are also attached to the particular source code element. For example, the annotation key generator 222 may record the position of the annotation in an ordering of annotations attached to the particular source code element. In some implementations, the index represents a line number on which the annotation appears. In some implementations, the index represents a character offset that includes a line number and columns number on which the annotation appears.

The system generates a natural key for the annotation by combining the first key for the particular source code element and the index for the annotation (310). For example, the annotation key generator 222 may combine the first key and the index according to the techniques described above to generate the natural key for the annotation. As described above, the system can generate the natural key by generating structural delimiters around the key for the particular source code element followed by a semantic tag for the annotation that includes the index.

The system populates a database (312). For example, the artifact generator 250 may create a data entry in the artifact collection 280 for the annotation at issue such that the data entry has the natural key. In some implementations, the creation of this data entry includes generating the natural key, and following the creation of the natural key, populating a database entry. However, other orders of operations are possible. In some implementations, the creation of this data entry includes generating the natural key, and following the creation of the natural key, populating a database entry. However, other orders of operations are possible.

For the example annotation 104, using a technique that produces a natural key of Test#class#annot0, the following tables can be created in a the artifact collection 280. In an annotations table, each of the annotations can be listed with two attributes: the index for the annotation and the annotation name. for forming a natural key (Element Name and Index) and a column for the annotation name. For the annotation ExampleAnnot associated with a class, having the key "Test#class", the key is {Test#class}#annot0. For the annotation Name, which is attached to the annotatino argument nestedAnnot, the key is "{{{Test#class}#annot0}#nestedAnnot}#annot0".

Annotations Table:

| Key | Annotation Index | Annotation Name |
|---|---|---|
| {Test#class}#annot0 | 0 | ExampleAnnot |
| {{{Test#class}#annot0}#nestedAnnot}#annot0 | 0 | Name |

Attributes of annotation arguments can also be stored in the artifact collection 280. The annotation arguments may be identified with natural keys as well that are generated as described above.

In the following example annotation arguments table, each annotation argument is listed with three columns: the natural key, the argument name, and the value.

Arguments Table:

| Key | Argument Name | Value |
|---|---|---|
| {{Test#class}#annot0}#name | name | "Kirk" |
| {{{Test#class}#annot0}#addresses}#0 | addresses | "Address 1" |
| {{{Test#class}#annot0}#addresses}#1 | addresses | "Address 2" |
| {{{{Test#class}#annot0}#nestedAnnot}#annot0}#name | name | "Bones" |

The following pseudocode illustrates rows that would be added to respective database relations for the example in FIG. 1. Each line identifies a particular relation and includes one or more attributes. In other words, the "symbol_annotation" function is used to add an entry to the "symbol_annotation" relation, the "annotations" function is used to add an entry to the "annotations" relation, the "annotation_arg" function is used to add an entry to the "annotation_arg" relation, the "annotation_arg_literal" function is used to add an entry to the "annotation_arg_literal" relation, the "annotation_arg_array_element" function is used to add an entry to the "annotation_arg_array_element" relation, and the "annotation_arg_annot" is used to add an entry to the "annotation_arg_annot" relation The first attribute in each of the following examples is the natural key that would be generated for the example in FIG. 1 using the techniques described above.

symbol_annotation(
  "Test#class",
  0,
  "{Test#class}#annot0")
annotations(
  "{Test#class}#annot0",
  "ExampleAnnot#class")
annotation_arg(
  "{Test#class}#annot0",
  "name",
  "{{Test#class}#annot0}#name")
annotation_arg_literal(
  "{{Test#class}#annot0}#name",
  "Kirk")
annotation_arg(
  "{Test#class}#annot0",
  "addresses",
  "{{Test#class}#annot0}#addresses")
annotation_arg_array_element(
  "{{Test#class}#annot0}#addresses",
  0,
  "{{{Test#class}#annot0}#addresses}#0")
annotation_arg_literal(
  "{{{Test#class}#annot0}#addresses}#0",
  "Address 1")
annotation_arg_array_element(
  "{{Test#class}#annot0}#addresses",
  1,
  "{{{Test#class}#annot0}#addresses}#1")
annotation_arg_literal(
  "{{{Test#class}#annot0}#addresses}#1",
  "Address 2")
annotation_arg(
  "{Test#class}#annot0",
  "nestedAnnot",
  "{{Test#class}#annot0}#nestedAnnot")
annotation_arg_annot(
  "{{Test#class}#annot0}#nestedAnnot",
  "{{{Test#class}#annot0}#nestedAnnot}#annot0")
annotations(
  "{{{Test#class}#annot0}#nestedAnnot}#annot0",
  "Name#class")
annotation_arg(
  "{{{Test#class}#annot0}#nestedAnnot}#annot0",
  "name",
  "{{{{Test#class}#annot0}#nestedAnnot}#annot0}#name")
annotation_arg_literal(
  "{{{{Test#class}#annot0}#nestedAnnot}#annot0}#name",
  "Bones")

The system receives a database request t (314) and process the database request (316). In some examples, the analysis engine 210 can receive a request for source code properties 265 that includes the natural key of the annotation at issue. The analysis engine 210 can run one or more queries for the request on the artifact collection 280. Some or all of these queries may include the natural key of the annotation at issue, and the results of the queries may include data of the annotation at issue, or data generated based on the annotation at issue.

In some examples, the analysis engine 210 can receive a for source code properties 265 that requires a join of two database tables. The analysis engine can run one or more queries for the request that include relating pairs of records in the artifact collection 280. These queries may include, but are not limited to, database joins.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:

receiving a source code representation of a collection of source code, the source code having an annotation attached to a particular source code element in the source code, wherein the annotation comprises structured metadata for the particular source code element in the source code;

identifying a first key of the particular source code element, the first key uniquely distinguishing the particular source code element from other source code elements in the collection of source code;

determining how many annotations are attached to the particular source code element;

generating an index for the annotation, the index representing a position of the annotation in an order of all annotations attached to the particular source code element;

generating a natural key for the annotation including combining the first key of the particular source code element and the index for the annotation; and generating, in a database, a data entry for the annotation, the data entry having the natural key for the annotation.

Embodiment 2 is the method of embodiment 1, wherein generating the natural key for the annotation comprises generating structural delimiters that surround the key of the particular source code element followed by a semantic tag for annotations, wherein the semantic tag includes the index for the annotation.

Embodiment 3 is the method of any one of embodiments 1-2, further comprising:

generating respective natural keys for one or more annotation arguments of the annotation.

Embodiment 4 is the method of embodiment 3, wherein generating a natural key for an annotation argument of the annotation comprises:

combining the natural key for the annotation with a name for the annotation argument.

Embodiment 5 is the method of embodiment 4, wherein generating a natural key for an annotation argument of the annotation comprises:

generating structural delimiters that surround the natural key for the annotation followed by a semantic tag that includes a name of the annotation argument.

Embodiment 6 is the method of embodiment 4, wherein an annotation argument of the annotation is a structural annotation argument, and wherein generating the natural key for the annotation argument comprises:

generating structural delimiters that surround the natural key for the annotation argument followed by a semantic tag for structural annotation arguments.

Embodiment 7 is the method of embodiment 6, wherein the semantic tag for structural annotation arguments specifies that the structural annotation argument is a nested annotation.

Embodiment 8 is the method of embodiment 6, wherein the semantic tag for structural annotation arguments specifies that the structural annotation argument is an array element annotation argument.

Embodiment 9 is the method of embodiment 8, wherein the semantic tag for the array element annotation argument includes an index of the array element.

Embodiment 10 is the method of any one of embodiments 1-9, the method further comprising:

receiving a first database-request that includes the natural key; and searching the database using the natural key to identify the data entry for the annotation.

Embodiment 11 is the method of any one of embodiments 1-10, the method further comprising:

receiving a second database-request;

generating a response the second database-request by relating pairs of records in the database that contain matching natural keys.

Embodiment 12 is the method of embodiment 11, wherein the second database-request is a database join.

Embodiment 13 is the method of any one of embodiments 1-12, wherein the particular source code element is a class, a field, a method, a variable, a parameter, or a package.

Embodiment 14 is the method of any one of embodiments 1-13, wherein the source code comprises Java-language source code; and wherein the annotation is a Java annotation.

Embodiment 15 is a system comprising: one or more computers and one or more storage devices storing instructions that are operable, when executed by the one or more computers, to cause the one or more computers to perform the method of any one of embodiments 1 to 14.

Embodiment 16 is a computer storage medium encoded with a computer program, the program comprising instructions that are operable, when executed by data processing apparatus, to cause the data processing apparatus to perform the method of any one of embodiments 1 to 14.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    receiving a source code representation of a collection of source code, the source code having an annotation attached to a particular source code element in the source code, wherein the annotation comprises structured metadata for the particular source code element in the source code;
    identifying a first key of the particular source code element, the first key uniquely distinguishing the particular source code element from other source code elements in the collection of source code;
    determining how many annotations are attached to the particular source code element;

generating an index for the annotation, the index representing a position of the annotation in an order of all annotations attached to the particular source code element;

generating a natural key for the annotation including combining structural delimiters surrounding the first key of the particular source code element with a semantic tag for annotations, wherein the semantic tag includes the index for the annotation; and generating, in a database, a data entry for the annotation, the data entry having the natural key for the annotation.

2. The method of claim 1, further comprising:

generating respective natural keys for one or more annotation arguments of the annotation.

3. The method of claim 2, wherein generating a natural key for an annotation argument of the annotation comprises:

combining the natural key for the annotation with a name for the annotation argument.

4. The method of claim 3, wherein generating a natural key for an annotation argument of the annotation comprises:

combining structural delimiters that surround the natural key for the annotation with a second semantic tag that includes a name of the annotation argument.

5. The method of claim 3, wherein an annotation argument of the annotation is a structural annotation argument, and wherein generating the natural key for the structural annotation argument comprises:

combining structural delimiters that surround the natural key for the annotation argument with a semantic tag for structural annotation arguments.

6. The method of claim 5, wherein the semantic tag for structural annotation arguments specifies that the structural annotation argument is a nested annotation.

7. The method of claim 5, wherein the semantic tag for structural annotation arguments specifies that the structural annotation argument is an array element annotation argument.

8. The method of claim 7, wherein the semantic tag for the array element annotation argument includes an index of the array element.

9. The method of claim 1, further comprising:

receiving a first database-request that includes the natural key; and searching the database using the natural key to identify the data entry for the annotation.

10. The method of claim 1, further comprising:

receiving a second database-request; and generating a response the second database-request by relating pairs of records in the database that contain matching natural keys.

11. The method of claim 10, wherein the second database-request is a database join.

12. The method of claim 1, wherein the particular source code element is a class, a field, a method, a variable, a parameter, or a package.

13. The method of claim 1, wherein the source code comprises Java-language source code; and wherein the annotation is a Java annotation.

14. A system comprising:

one or more computers and one or more storage devices storing instructions that are operable, when executed by the one or more computers, to cause the one or more computers to perform operations comprising:

receiving a source code representation of a collection of source code, the source code having an annotation attached to a particular source code element in the source code, wherein the annotation comprises structured metadata for the particular source code element in the source code;

identifying a first key of the particular source code element, the first key uniquely distinguishing the particular source code element from other source code elements in the collection of source code;

determining how many annotations are attached to the particular source code element;

generating an index for the annotation, the index representing a position of the annotation in an order of all annotations attached to the particular source code element;

generating a natural key for the annotation including combining structural delimiters surrounding the first key of the particular source code element with a semantic tag for annotations, wherein the semantic tag includes the index for the annotation; and generating, in a database, a data entry for the annotation, the data entry having the natural key for the annotation.

15. The system of claim 14, wherein the operations further comprise:

generating respective natural keys for one or more annotation arguments of the annotation.

16. The system of claim 15, wherein generating a natural key for an annotation argument of the annotation comprises:

combining the natural key for the annotation with a name for the annotation argument.

17. The system of claim 16, wherein generating a natural key for an annotation argument of the annotation comprises:

combining structural delimiters that surround the natural key for the annotation with a second semantic tag that includes a name of the annotation argument.

18. The system of claim 16, wherein an annotation argument of the annotation is a structural annotation argument, and wherein generating the natural key for the structural annotation argument comprises:

combining structural delimiters that surround the natural key for the annotation argument with a semantic tag for structural annotation arguments.

19. The system of claim 18, wherein the semantic tag for structural annotation arguments specifies that the structural annotation argument is a nested annotation.

20. The system of claim 18, wherein the semantic tag for structural annotation arguments specifies that the structural annotation argument is an array element annotation argument.

21. The system of claim 20, wherein the semantic tag for the array element annotation argument includes an index of the array element.

22. The system of claim 14, wherein the operations further comprise:

receiving a first database-request that includes the natural key; and searching the database using the natural key to identify the data entry for the annotation.

23. The system of claim 14, wherein the operations further comprise:

receiving a second database-request; and generating a response the second database-request by relating pairs of records in the database that contain matching natural keys.

24. The system of claim 23, wherein the second database-request is a database join.

25. The system of claim 14, wherein the particular source code element is a class, a field, a method, a variable, a parameter, or a package.

26. The system of claim 14, wherein the source code comprises Java-language source code; and wherein the annotation is a Java annotation.

27. A computer program product, encoded on one or more non-transitory computer storage media, comprising instructions that when executed by one or more computers cause the one or more computers to perform operations comprising:
- receiving a source code representation of a collection of source code, the source code having an annotation attached to a particular source code element in the source code, wherein the annotation comprises structured metadata for the particular source code element in the source code;
- identifying a first key of the particular source code element, the first key uniquely distinguishing the particular source code element from other source code elements in the collection of source code;
- determining how many annotations are attached to the particular source code element;
- generating an index for the annotation, the index representing a position of the annotation in an order of all annotations attached to the particular source code element;
- generating a natural key for the annotation including combining structural delimiters surrounding the first key of the particular source code element with a semantic tag for annotations, wherein the semantic tag includes the index for the annotation; and
- generating, in a database, a data entry for the annotation, the data entry having the natural key for the annotation.

* * * * *